United States Patent
Zhu et al.

(10) Patent No.: US 9,286,678 B2
(45) Date of Patent: Mar. 15, 2016

(54) CAMERA CALIBRATION USING FEATURE IDENTIFICATION

(75) Inventors: Hongwei Zhu, Fresno, CA (US); Farzin Aghdasi, Clovis, CA (US); Greg Millar, Coarsegold, CA (US)

(73) Assignee: Pelco, Inc., Clovis, CA (US)

( * ) Notice: Subject to any disclaimer, the term of this patent is extended or adjusted under 35 U.S.C. 154(b) by 455 days.

(21) Appl. No.: 13/338,555

(22) Filed: Dec. 28, 2011

(65) Prior Publication Data

US 2013/0169822 A1 Jul. 4, 2013

(51) Int. Cl.
  *G06T 7/00* (2006.01)
  *G06T 19/00* (2011.01)
  *H04N 7/18* (2006.01)

(52) U.S. Cl.
  CPC ..... *G06T 7/0018* (2013.01); *G06T 2207/10016* (2013.01); *G06T 2207/20076* (2013.01); *G06T 2207/30196* (2013.01); *G06T 2207/30232* (2013.01); *G06T 2207/30236* (2013.01)

(58) Field of Classification Search
  CPC ......... G06G 1/054; H04N 7/18; H04N 17/00; G06K 9/46; G01C 3/00
  USPC ............ 348/61, 169, 180, 184; 382/103, 100; 340/937; 381/103
  See application file for complete search history.

(56) References Cited

U.S. PATENT DOCUMENTS

| | | | |
|---|---|---|---|
| 5,734,337 A * | 3/1998 | Kupersmit | 340/937 |
| 7,356,425 B2 | 4/2008 | Krahnstoever et al. | |
| 7,391,907 B1 | 6/2008 | Venetianer et al. | |
| 8,059,154 B1 * | 11/2011 | Kiro et al. | 348/184 |
| 8,744,125 B2 | 6/2014 | Zhu et al. | |
| 2004/0105570 A1 * | 6/2004 | Venetianer et al. | 382/100 |
| 2007/0274563 A1 | 11/2007 | Jung et al. | |
| 2008/0095403 A1 | 4/2008 | Benhammou | |
| 2008/0291278 A1 | 11/2008 | Zhang et al. | |
| 2010/0054535 A1 | 3/2010 | Brown et al. | |
| 2010/0066828 A1 | 3/2010 | Disaro et al. | |
| 2010/0103266 A1 | 4/2010 | Merkel et al. | |
| 2010/0245576 A1 * | 9/2010 | Inui et al. | 348/148 |
| 2011/0050897 A1 | 3/2011 | Cobb et al. | |
| 2011/0128388 A1 | 6/2011 | Pai et al. | |

(Continued)

FOREIGN PATENT DOCUMENTS

CN  101750049 A  *  6/2010
EP  1873716 A1  1/2008

OTHER PUBLICATIONS

Lin, Pedestrian and Vehicle Classification Surveillance System for Street-Crossing Safety, Jul. 2011, International Conference on Image Processing, Computer Vision and Pattern Recognition, vol. II, p. 564-570.*

(Continued)

*Primary Examiner* — Jorge L Ortiz Criado
*Assistant Examiner* — Albert Kir
(74) *Attorney, Agent, or Firm* — Hunter Clark PLLC

(57) ABSTRACT

Disclosed are methods, systems, computer readable media and other implementations, including a method to calibrate a camera that includes capturing by the camera a frame of a scene, identifying features appearing in the captured frame, the features associated with pre-determined values representative of physical attributes of one or more objects, and determining parameters of the camera based on the identified features appearing in the captured frame and the pre-determined values associated with the identified features.

21 Claims, 8 Drawing Sheets

(56) References Cited

U.S. PATENT DOCUMENTS

| | | | |
|---|---|---|---|
| 2011/0149041 A1 | 6/2011 | Eccles et al. | |
| 2012/0169882 A1 | 7/2012 | Millar et al. | |
| 2012/0170802 A1* | 7/2012 | Millar et al. | 382/103 |
| 2012/0170803 A1 | 7/2012 | Millar et al. | |
| 2012/0293663 A1* | 11/2012 | Liu et al. | 348/169 |
| 2013/0128050 A1 | 5/2013 | Aghdasi et al. | |
| 2013/0170696 A1* | 7/2013 | Zhu et al. | 382/103 |

OTHER PUBLICATIONS

Chen, Accurate Self-Calibration of Two Cameras by Observations of a Moving Person on a Ground Plane, Sep. 2007, Advanced Video and Signal Based Surveillance, p. 129-134.*

Johannes Schels et al., "Self-calibrating 3D context for retrieving people with luggage", Computer Vision Workshops (ICCV Workshops), 2011 IEEE International Conference on, IEEE, Nov. 6, 2011, pp. 1920-1927.

T Chen et al., "Accurate self-calibration of two camers by observations of a moving person on a ground plane", IEEE Conference on Advanced Video and Signal Based Surveillance, Jan. 1, 2007, pp. 129-134.

Tu, P. H. et al., "An intelligent video framework for homeland protection", Proc. of Spie (Unattended Ground, Sea and Air Sensor Technologies and Applications, IX), vol. 6562, 2007.

D-T Lin et al., "Pedestrian and Vehicle Classification Surveilance System for Street-Crossing Safety", The 2011 International Conference on Image Processing, Computer Vision, and Pattern Recognition (IPCV'11), Jul. 19, 2011.

Bose, B., & Grimson, E. (Oct. 2003). Learning to use scene context for object classification in surveillance. In Proc. Joint IEEE Int'l Workshop on VS-PETS, Nice, France, p. 94-101.

International Search Report and Written Opinion of the International Search Authority (EPO) dated Jul. 25, 2013 for International Application No. PCT/US2012/069148, 9 pages.

International Search Report and Written Opinion of the International Search Authority (EPO) dated Mar. 21, 2013 for International Application No. PCT/US2012/071608, 13 pages.

Non-Final Office Action for Related U.S. Appl. No. 13/338,617 dated Jul. 2, 2013.

International Preliminary Report on Patentability for International Application No. PCT/US2012/069148, mailed Jul. 10, 2014, 7 pages.

International Preliminary Report on Patentability for International Application No. PCT/US2012/71608, mailed Jul. 10, 2014, 8 pages.

* cited by examiner

CAMERA CALIBRATION USING FEATURE IDENTIFICATION

CROSS-REFERENCE TO RELATED APPLICATION

The present application is related to the concurrently filed patent application entitled "CLUSTERING-BASED OBJECT CLASSIFICATION", U.S. patent application Ser. No. 13/338,617, which issued as U.S. Pat. No. 8,744,125, the content of which is hereby incorporated by reference in its entirety.

BACKGROUND

Camera calibration is generally used for video surveillance applications that require determination of physical properties of objects of interest, such as moving speed, object height, size, etc. Accurate calibration often requires delicate measurements conducted for a scene captured by the cameras viewing the scene. Such measurement operations can be time-consuming, and may also be impractical if a large-scale surveillance operation, involving many cameras, is to be implemented.

SUMMARY

Thus, practical, easy-to-handle, and effective camera calibration approaches, procedure and techniques are described herein. In some embodiments, a camera calibration approach is provided for video security applications configured to detect and track common type subjects (e.g., people, vehicles) that stay or move on a plane (e.g., ground, building floor) by processing video streams captured by cameras installed above the plane and pointing downward. The calibration approaches described herein require very little effort, or even no effort at all, from users to calibrate the cameras deployed. In some implementations, a user may simply specify or identify an object (e.g., a person with a known height, a car with a known length), and/or identify features of such an object, at several locations in the field of view of a camera, or indicate known geometry/structure patterns between lines on the monitored plane, e.g., on-plane parallel lines, vertical lines perpendicular to the plane, on-plane lines with known angles between them. Using those identified features, the camera viewing the scene with those identified features can be calibrated. In some implementations, camera calibration may be performed automatically based, for example, on a clustering-based approach that includes: 1) detect and track objects which appear in the camera's view, 2) learn the patterns of object features via clustering operations and perform object classification automatically, and 3) identify features of the classified object(s) to extract constraint data for use of camera auto-calibration.

Accordingly, in some embodiments, a method to calibrate a camera is provided. The method includes capturing by the camera a frame of a scene, identifying features appearing in the captured frame, the features associated with pre-determined values representative of physical attributes of one or more objects, and determining parameters of the camera based on the identified features appearing in the captured frame and the pre-determined values associated with the identified features.

Embodiments of the method may include at least some of the features described in the present disclosure, including one or more of the following features.

Identifying features appearing in the captured frame may include automatically detecting at least one object appearing in one or more frames, automatically classifying the detected at least one object appearing in the one or more frames, and automatically identifying features of the classified at least one object, the automatically identified features associated with pre-determined values representative of physical attributes for the at least one classified object.

Automatically classifying the detected at least one object may include determining aspect ratios based on dimensions of the at least one detected object, determining object type for the at least one object based on the determined aspect ratios, and comparing the dimensions of the at least one object to statistical measures stored in a cluster corresponding to the determined object type.

Comparing the dimensions of the at least one object may include updating, based on the dimensions of the at least one object, local models of object size for locations visited by persistently tracked objects, and updating global clusters by associating local models with the global clusters, the local models having an object size matching that associated with the global cluster.

The classified at least one object may include one or more of, for example, a person associated with a pre-determined average height, and/or a car associated with a pre-determined average length.

Determining the parameters of the camera may include determining one or more of, for example, a focal length f of the camera, a tilt angle $\phi$ of the camera, a yaw angle $\beta$ of the camera, and/or a height h of the camera above a plane of the scene corresponding to the captured frame.

Determining the parameters of the camera based on the identified features may include minimizing an error function of constraint terms associated with the identified features. Determining the parameters of the camera may also include removing noisy constraints (outliers) using RANSAC (RANdom SAmple Consensus) procedure.

The identified features may include one or more of, for example, distance between two points in the captured frame of the scene, a vertical line extending from a plane of the captured frame, and/or two lines extending between two pairs of points in the captured frame with one of the two lines being at an angle relative to the other of the two lines.

The distance between the two points in the captured frame may include length of a car in the captured frame of the scene, the car associated with an approximate pre-determined length.

The vertical line extending from the plane of the scene may include height of a person in the scene, the person associated with an approximate pre-determined height.

The method may further include determining attributes of objects located in the scene based on camera coordinates of images of the objects appearing in one or more captured frames, and based on the determined parameters of the camera.

The determined attributes of the objects may include one or more of, for example, spatial position in the scene of at least one of the objects, speed, and/or length of the at least one of the objects in a particular direction.

In some embodiments, a system is provided. The system includes at least one camera to capture frame data, and one or more processors configured to perform operations to calibrate the at least one camera. The operations the one or more processors are configured to perform include capturing by the at least one camera a frame of a scene, identifying features appearing in the captured frame, the features associated with pre-determined values representative of physical attributes of one or more objects, determining parameters of the at least one camera based on the identified features appearing in the captured frame and the pre-determined values associated with the identified features.

Embodiments of the system may include at least some of features described in the present disclosure, including at least some of the features described above in relation to the method.

In some embodiments, a non-transitory computer readable media is provided. The computer readable media is programmed with a set of computer instructions executable on a processor that, when executed, cause operations including capturing by a camera a frame of a scene, identifying features appearing in the captured frame, the features associated with pre-determined values representative of physical attributes of one or more objects, and determining parameters of the camera based on the identified features appearing in the captured frame and the pre-determined values associated with the identified features.

Embodiments of the computer readable media may include at least some of features described in the present disclosure, including at least some of the features described above in relation to the method and the system.

As used herein, the term "about" refers to a +/−10% variation from the nominal value. It is to be understood that such a variation is always included in a given value provided herein, whether or not it is specifically referred to.

As used herein, including in the claims, "and" or "or" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

Unless defined otherwise, all technical and scientific terms used herein have the same meaning as commonly understood by one of ordinary skill in the art to which this disclosure belongs.

Details of one or more implementations are set forth in the accompanying drawings and in the description below. Further features, aspects, and advantages will become apparent from the description, the drawings, and the claims.

BRIEF DESCRIPTION OF THE FIGURES

Like reference symbols in the various drawings indicate like elements.

DETAILED DESCRIPTION

Figure 1A:
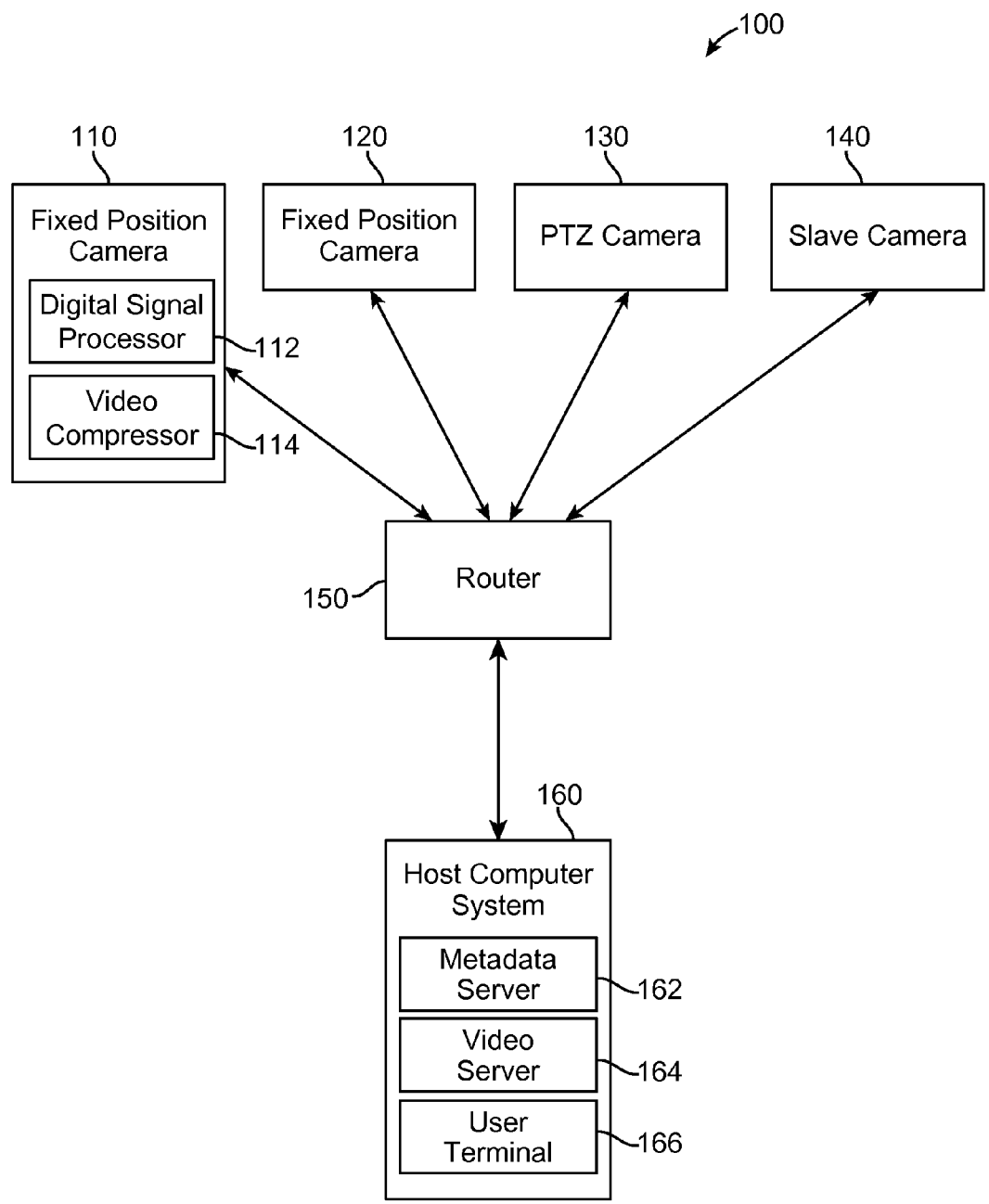
FIG. 1A is a block diagram of a camera network.

Disclosed herein are methods, systems, apparatus, devices, products and other implementations, including a method to calibrate a camera (e.g., to relate coordinates of captured frames to spatial physical positions corresponding to the captured frames) that includes capturing by the camera a frame of a scene, identifying features appearing in the captured frame, the features associated with pre-determined values representative of physical attributes of one or more objects, and determining parameters of the camera based on the identified features appearing in the captured frame and the pre-determined values associated with the identified features.

System Configuration and Camera Calibration Operations

Generally, each camera in a camera network has an associated point of view and field of view. A point of view refers to the position and perspective from which a physical region is being viewed by a camera. A field of view refers to the physical region imaged in frames by the camera. A camera in the camera network may contain a processor, such as a digital signal processor, or a general purpose processor, can process frames to calibrate the camera to relate coordinates of captured frames to spatial physical positions corresponding to the captured frames. For example, and as will be discussed in greater details below, features appearing in the captured frame(s) may be identified (automatically or with the aid of a user), and parameters of the camera that captured the frames (e.g., parameters such as focal length of the camera, the camera's tilt and yaw angles, and/or the vertical elevation of the camera) may be determined based on the identified features and pre-determined values, representative of physical attributes of one or more objects (e.g., average length of a car, average length of a person, etc.) associated with those features. For example, features such as a person's height (i.e., longest vertical line associated with an object identified as a person) may be identified in the frame, and a pre-determined average height of a person (e.g., an adult person) may be used in conjunction with the identified height feature to facilitate the calibration operation.

One or more of the cameras may also be configured to perform other operations, including, for example, motion determination for objects appearing in the captured frames, object tracking, object analysis, etc. A camera may, in some embodiments, associate metadata with images of a moving object. Such metadata defines and represents various characteristics of the object. For instance, the metadata can represent the location of the object within the camera's field of view (e.g., in a 2-D coordinate system measured in pixels of the camera's CCD), the width of the image of the object (e.g., measured in pixels), the height of the object (e.g., measured in pixels), the direction the image of the object is moving, the speed of the image of the object, the color of the object, and/or a category of the object. The cameras, or a remote computing system communicating therewith, may also perform classification operations in relation to objects appearing in captured frames to, for example, classify objects into categories such as humans, animals, cars, small trucks, large trucks, and/or SUVs. Object classification can be performed using such techniques as object clustering, image morphology, neural net classification, and/or other types of image processing techniques/procedures to identify objects. Metadata regarding events involving moving objects may also be generated by the cameras of the camera network (or a determination of such events may be performed remotely). Events that may be determined by the camera(s) or a remote computing system may include, for example, an object entering the field of view of a camera, an object leaving the field of view of the camera, etc.

In some embodiments, a camera for which calibration is to be performed with respect to the view captured by the camera may transmit one or more frames of a video feed (possibly compressed) to a remote computing system, such as a host computer system, and/or may transmit to such a host computer system data representative of motion and other characteristics of objects (e.g., moving objects) appearing in the view of the camera. In such embodiments, the host computer system receiving camera frame data and/or other data representative of motion and other object characteristics may use the received data to perform operations such as camera calibration according to the procedures described herein.

In some embodiments, data representative of motion (and other object characteristics) may be used by a host computer to perform other functions and operations. For example, in some implementations, using the data representative of the motion and/or other characteristics of objects received from multiple cameras, the host computer system may be configured to present motion data for the objects appearing in the images captured by the cameras on a single global image (e.g., a map, an overhead image of the entire area covered by the cameras, etc.) so as to enable a user to see a graphical representation of movement of multiple objects (including the motion of objects relative to each other) on the single global image. The host computer can enable a user to select an area from that global image and receive a video feed from a camera(s) capturing images from that area. In some implementations, the host computer system may be configured to determine whether images of moving objects that appear (either simultaneously or non-simultaneously) in the fields of view of different cameras represent the same object. If a user specifies that this object is to be tracked, the host computer system displays to the user frames of the video feed from a camera determined to have a preferable view of the object. As the object moves, frames may be displayed from a video feed of a different camera if another camera is determined to have the preferable view. Additional details regarding such further functions and operations are provided, for example, in patent application Ser. No. 12/982,138, entitled "Tracking Moving Objects Using a Camera Network," filed Dec. 30, 2010, and in patent application Ser. No. 13/302,984, entitled "Geographic Map Based Control," filed Nov. 22, 2011, the contents of all of which are hereby incorporated by reference in their entireties.

With reference to FIG. 1A, an illustration of a block diagram of a security camera network 100 is shown. Security camera network 100 includes a plurality of cameras which may be of the same or different types. For example, in some embodiments, the camera network 100 may include one or more fixed position cameras (such as cameras 110 and 120), one or more PTZ (Pan-Tilt-Zoom) camera 130, one or more slave camera 140 (e.g., a camera that does not perform locally any image/video analysis, but instead transmits captures images/frames to a remote device, such as a remote server). Additional or fewer cameras, of various types (and not just one of the camera types depicted in FIG. 1), may be deployed in the camera network 100, and the camera networks 100 may have zero, one, or more than one of each type of camera. For example, a security camera network could include five fixed cameras and no other types of cameras. As another example, a security camera network could have three fixed position cameras, three PTZ cameras, and one slave camera.

The security camera network 100 also includes a router 150. The fixed position cameras 110 and 120, the PTZ camera 130, and the slave camera 140 may communicate with the router 150 using a wired connection (e.g., a LAN connection) or a wireless connection. Router 150 communicates with a computing system, such as host computer system 160. Router 150 communicates with host computer system 160 using either a wired connection, such as a local area network connection, or a wireless connection. In some implementations, one or more of the cameras 110, 120, 130, and/or 140 may transmit data (video and/or other data, such as metadata) directly to the host computer system 160 using, for example, a transceiver or some other communication device. In some implementations, the computing system may be a distributed computer system. The devices of security camera network 100, e.g., the cameras and the host computer system, may communicate based, for example, on a packet based protocol, and/or may communicate via another network such as the Internet. In such embodiments, the devices/components of the security camera network 100 may be assigned network addresses, such as Internet Protocol (IP) addresses.

In some embodiments, the host computer system 160 includes a metadata server 162, a video server 164, and a user terminal 166. The metadata server 162 is configured to receive, store, and analyze metadata (or some other data format) received from the cameras communicating with host computer system 160. Video server 164 may receive and store compressed and/or uncompressed data (e.g., video/image data) from the cameras communicating with the host computer system 160. User terminal 166 allows a user, such as a security guard, to interface with the host system 160 so as to control at least some of the system's operations and functionalities, and to monitor information provided from the cameras of the security cameras network 100. In some embodiments, user terminal 166 can display one or more video feeds to the user at one time. In some embodiments, the functions of metadata server 162, video server 164, and user terminal 166 may be performed by separate computer systems. In some embodiments, such functions may be performed by one computer system.

The fixed position cameras 110 and 120 may be set in a fixed position, e.g., mounted to the eaves of a building, to capture a video feed of the building's emergency exit. The field of view of such fixed position cameras, unless moved or adjusted by some external force, will remain unchanged. As shown in FIG. 1A, fixed position camera 110 includes a processor 112, such as a digital signal processor (DSP), and a video compressor 114. As frames of the field of view of fixed position camera 110 are captured by fixed position camera 110, these frames are processed by digital signal processor 112, by a micro-processor, or by any other type of processor, to determine, for example, if one or more moving objects are present and/or to perform other functions and operations.

Figure 1B:
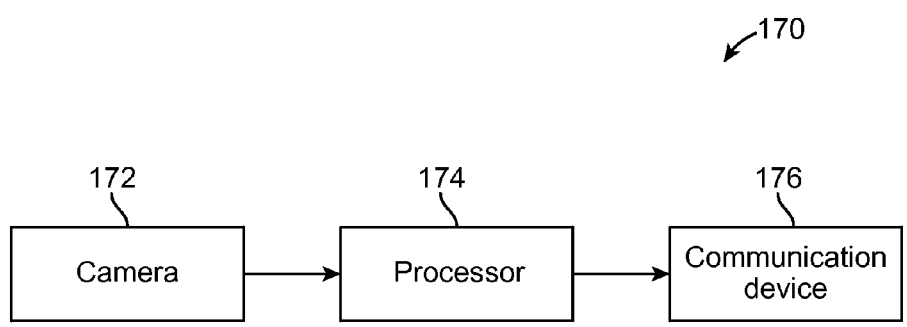
FIG. 1B is a schematic diagram of an example embodiment of a camera.

More generally, and with reference to FIG. 1B, a schematic diagram of an example embodiment of a camera 170 (also referred to as a video source) is shown. The configuration of the camera 170 may be similar to the configuration of at least one of the cameras 110, 120, 130, and/or 140 depicted in FIG. 1A (although each of the cameras 110, 120, 130, and/or 140 may have features unique to it, e.g., the PTZ camera may be able be spatially displaced to control the parameters of the image captured by it). The camera 170 generally includes a capture unit 172 (sometimes referred to as the "camera" of a video source device) that is configured to provide raw image/video data to a processor 174 of the camera 170. The capture unit 172 may be a charge-coupled device (CCD) based capture unit, or may be based on other suitable technologies. The processor 174 electrically coupled to the capture unit can include any type processing unit and memory. Additionally, the processor 174 may be used in place of, or in addition to, the processor 112 and video compressor 114 of the fixed position camera 110. In some implementations, the processor 174 may be configured, for example, to compress the raw video data provided to it by the capture unit 172 into a digital video format, e.g., MPEG. In some implementations, and as will become apparent below, the processor 174 may also be configured to perform at least some of the procedures for camera calibration, object identification and classification, and/or motion determination. The processor 174 may also be configured to perform data modification, data packetization, creation of metadata, etc. Resultant processed data, e.g., compressed video data, data representative of objects and/or their motions (for example, metadata representative of identifiable features in the captured raw data) is provided (streamed) to, for example, a communication device 176 which may be a network device, a modem, wireless interface, various transceiver types, etc. The streamed data is transmitted to the router 150 for transmission to, for example, the host computer system 160. In some embodiments, the communication device 176 may transmit data directly to the system 160 without having to first transmit such data to the router 150. While the capture unit 172, the processor 174, and the communication device 176 have been shown as separate units/devices, their functions can be provided in a single device or in two devices rather than the three separate units/devices as illustrated.

In some embodiments, a scene analyzer procedure may be implemented in the capture unit 172, the processor 174, and/or a remote workstation to, for example, identify features in a frame based on which calibration operations may be performed, to detect and track an object in the monitored scene, etc. Examples of image/video processing to determine the presence and/or motion and other characteristics of one or more objects are described, for example, in patent application Ser. No. 12/982,601, entitled "Searching Recorded Video," the content of which is hereby incorporated by reference in its entirety. In circumstances in which scene analysis processing is performed by the camera 170, data about events and objects identified or determined from captured video data can be sent as metadata, or using some other data format, that includes data representative of objects' motion, behavior and characteristics (with or without also sending video data) to the host computer system 160. Such data representative of behavior, motion and characteristics of objects in the field of views of the cameras can include, for example, the detection of a person crossing a trip wire, the detection of a red vehicle, etc. As noted, alternatively and/or additionally, the video data could be streamed over to the host computer system 160 so that processing and analysis may be performed, at least in part, at the host computer system 160.

Data generated based on frames captured by the cameras may include, for example, information on features in the captured frames, including, for example, type of objects captured in the frames, salient features of such objects (e.g., lines constituting the length, height, width, etc., of such objects), location of the objects, directions the objects are moving in, speed the objects are moving at, colors of the objects, etc.

For example, location of an object may be expressed as two-dimensional coordinates in a two-dimensional coordinate system associated with one of the cameras. Therefore, these two-dimensional coordinates are associated with the position of the pixel group constituting the object in the frame(s) captured by the particular camera. The two-dimensional coordinates of the object may be determined to be a point within the frame(s) captured by the cameras. In some configurations, the coordinates of the position of the object is deemed to be the middle of the lowest portion of the object (e.g., if the object is a person standing up, the position would be between the person's feet). The two dimensional coordinates may have a horizontal and vertical components. In some configurations, the horizontal and vertical components are measured in numbers of pixels. For example, a location of {613, 427} would mean that the middle of the lowest portion of the object is 613 pixels along the x-axis and 427 pixels along the y-axis of the field of view of the camera. As the object moves, the coordinates associated with the location of the object would change. Further, if the same object is also visible in the fields of views of one or more other cameras, the location coordinates of the object determined by the other cameras would likely be different.

The height of the object may also be expressed in terms of numbers of pixels. The height of the object may be defined as the number of pixels from the bottom of the group of pixels constituting the object to the top of the group of pixels of the object. As such, if the object is close to the particular camera, the measured height would be greater than if the object is further from the camera. A feature, such as a height of an object (measured in pixels) determined to be a person, may be associated with a pre-determined value (e.g., 1.75 meters) representative of a physical attribute of the object, e.g., average height of an adult person. Calibration of cameras can thus be achieved based on the fact that the dimensions of features appearing in the camera view are known (i.e., their pixel dimensions are known) and the fact that those features' assumed real-world dimensions are also known. Using these values, an optimization procedure may be performed to determine parameters of the camera and thus determine a transformation matrix that can transform camera image coordinates to real-world coordinates (and vice versa).

Figure 2:
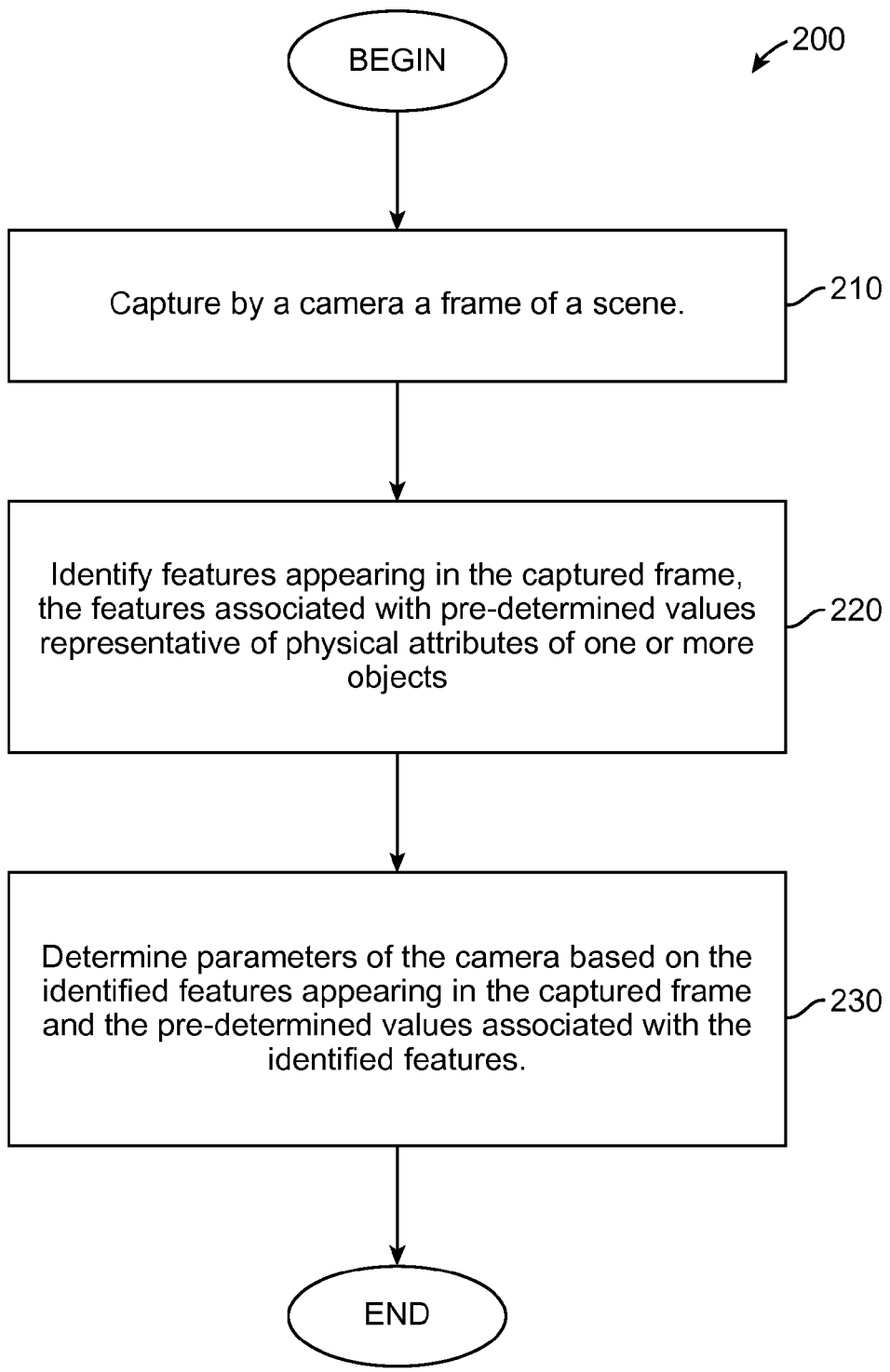
FIG. 2 is a flowchart of an example procedure to calibrate a camera.
Figure 3:
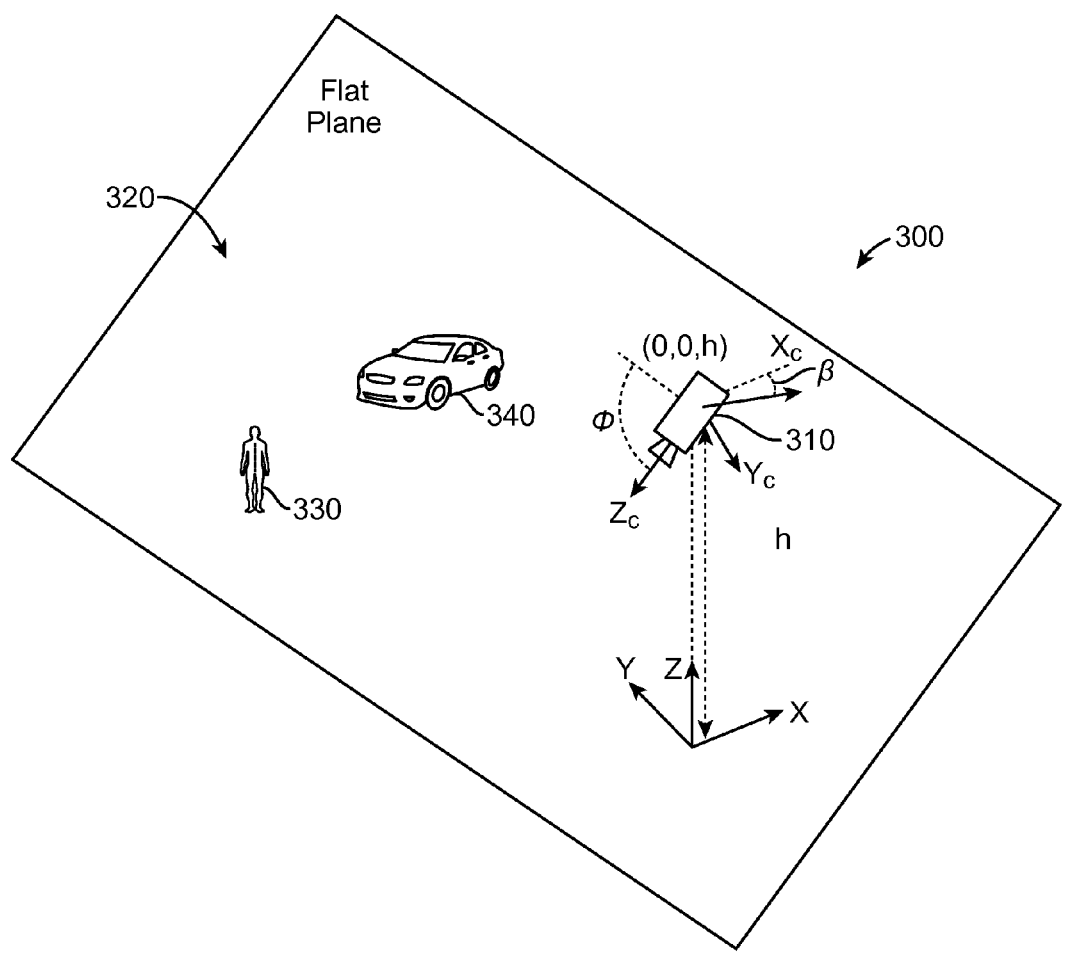
FIG. 3 is a diagram of an example system that includes a camera overlooking a scene with objects positioned on a substantially flat plane of the scene.

More particularly, with reference to FIG. 2, a flowchart of an example procedure 200 to calibrate a camera is shown. Operations of the procedure 200 are also described with reference to FIGS. 3 and 4. The procedure 200 includes capturing 210 by a camera a frame of a scene. For example, as depicted in FIG. 3, a camera 310 is positioned so that its field of view includes a scene 320 which may be, without loss of generality, a plane on which objects move and the camera(s) is located above the plane and is installed in such a way that it points downwards towards the plane. For the purpose of illustration, the example view 300 of FIG. 3 includes two objects, namely, a person 330 and a car 340. However, views captured by the camera(s) monitoring may include any number of objects that may be identified using the camera(s) surveying the scene in order to identify objects' features that can be used in the calibration process. Furthermore, while FIG. 3 shows only one camera, the scene 320 of the view 300 may be monitored by any number of cameras which may each be calibrated in accordance with the procedures, approaches and techniques described herein.

For the purpose of illustration, the camera 310 (which may have a configuration similar to, for example, that of any of the cameras depicted in FIGS. 1A and 1B) may be assumed to be one for which a pinhole model may be adopted to formulate the camera perspective projection. The pinhole camera model defines the geometric relationship between a 3D point and its 2D corresponding projection onto the image plane of the camera, through a perspective projection. The pinhole model may be derived from the a pinhole camera in the shape of a closed box or chamber such that one of its sides is a small hole to allow propagation of light and creates an image of the outside space on the opposite side of the box. The camera 310 may be assumed to have zero skew and to have a principal center located in the center of its image. Thus, the intrinsic parameters of the camera are reduced to one parameter, namely, the focal length f. Extrinsic parameters of the camera are related to its installation and may thus define the relationship between the camera and the monitored scene. The camera's extrinsic parameters may include, for example, the camera's height (i.e., its elevation above the plane of the scene 320) and three rotation angles (the pan angle, the tilt angle φ, and the yaw angle β). To simplify the problem, the pan angle can be disregarded and set to 0.

Figure 4:
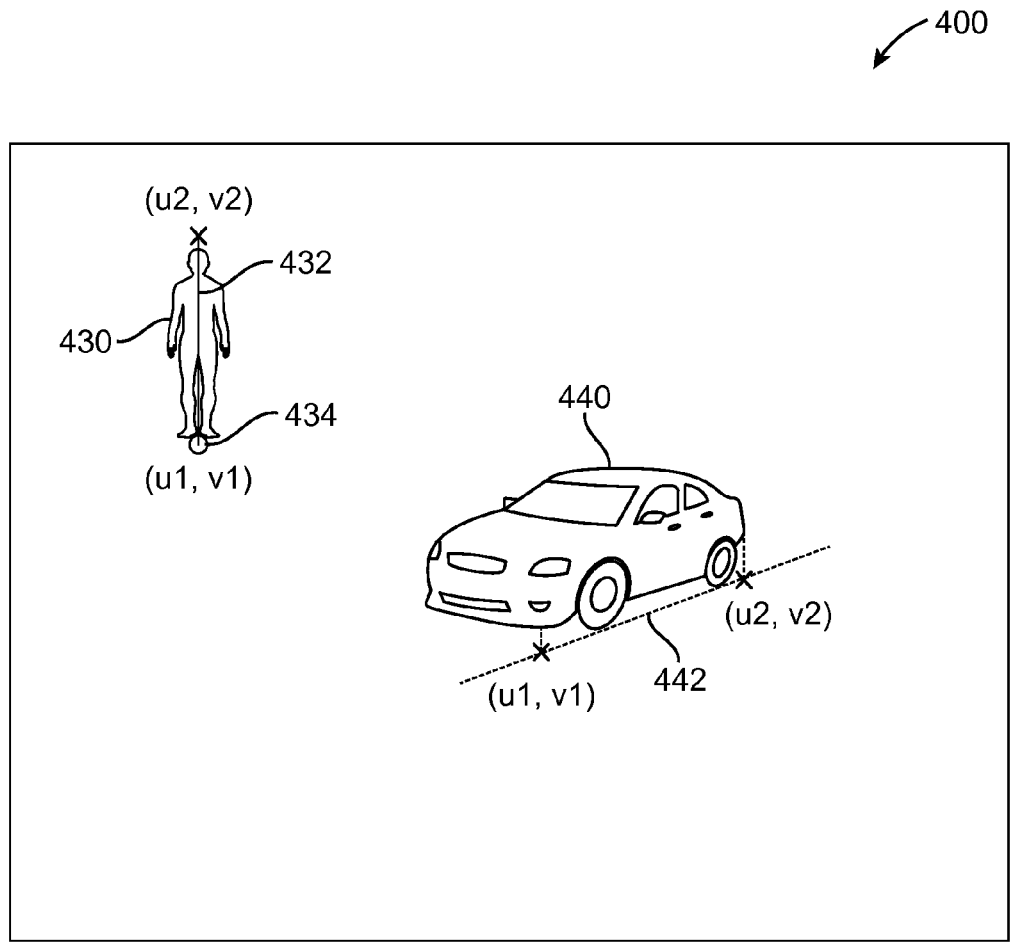
FIG. 4 is an example 2D image plane view captured by a camera.

With continued reference to FIG. 2, based on the frame (or multiple frames) captured by the camera, features appearing in the frame are identified 220. Identification of the features may be performed by a user specifying (e.g., using a user interface that may include a monitor, such as the user terminal 166 depicted in FIG. 1A, and an input device such a mouse or a pointing device) certain object features appearing in the captured frames such as various salient lines. For example, as shown in FIG. 4, illustrating an example 2D image plane view captured by a camera, a user may identify a vertical line 432 of a person object 430 appearing in FIG. 4 which corresponds to a person's height, and/or may identify a line 442 of a car object 440 appearing in FIG. 4 which corresponds to a length of the car object 440. As will be described in greater details below in relation to FIG. 5, in some embodiments, the features appearing in the frame with which the camera may be calibrated (e.g., the lines 432 and/or 442) may be identified automatically by, for example, automatically detecting and tracking objects appearing in one or more frames, automatically classifying the detected objects appearing in the one or more frames, and automatically identifying features of the classified objects. The identified features (be it features identified directly by a user or automatically identified features) are associated with pre-determined values representative of physical attributes of object types. For example, as noted, vertical lines corresponding to a person's height may be associated with a pre-determined average height (which may approximate the height of an object identified as a person), and the line corresponding to a car's length may be associated with a pre-determined average length for a sedan-type car (which may approximate the length of an object identified as a car). In some embodiments, a more refined identification of objects and/or their features may enable a more refined selection or matching of pre-determined values to the identified objects. For example, if the object identification process enables determining if a car is a sedan or an SUV, then based on that classification a pre-determined value associated with an object with such particular attributes may be used (e.g., an object determined to be a sedan may be associated with an average length of 5000 mm, whereas an object determined to be an SUV may be associated with an average length of 6000 mm.

Because dimensions of features identified in a frame(s) are associated with pixel dimensions determined from the captured frame and are also associated with pre-determined values, this information can be used to calibrate the camera so as to relate the coordinates of the captured frame(s) (and subsequent frames, as long as the parameters of calibrated camera do not change) to spatial physical positions of the scene captured by the camera (e.g., absolute or relative world coordinates of the captured scene). In calibrating the camera, parameters of the camera are determined, from which the relationships are determined (e.g., expressed as matrices) to relate the camera coordinate system to the real-world coordinates of the scene captured by the camera, as well as to relate, for example, a 3D world coordinate system to a 2D image plane coordinate system. Thus, the procedure 200 includes determining 230 parameters of the camera based on the identified features appearing in the captured frame and the pre-determined spatial physical values associated with the identified features.

More particularly, there are three coordinate systems involved in camera calibration: a 3D world coordinate system X-Y-Z, a 3D camera coordinate system $X_c$-$Y_c$-$Z_c$, and a 2D image plane coordinate system u-v. The relationship between the 3D world coordinate system and the camera's 3D coordinate system is illustrated in FIG. 3. The coordinate sets can be expressed as:

$$[su, sv, s]^t = K[X_c, Y_c, Z_c, 1]^t = C[X, Y, Z, 1]^t \text{ with } C = KSR[I|-T]$$ (1)

where $[su, sv, s]^t$ and $[X,Y,Z,1]^t$ are vectors containing homogeneous coordinates of image plane point at location (u, v) and world point at location, (X,Y,Z), and where s is a scale factor, and t denotes transpose. I is the 3×3 identity matrix, and K is the 3×3 matrix of the camera's intrinsic parameters (assuming no skew and square pixels, and a principal center at the image center) that is expressed as:

$$K = \begin{bmatrix} f & 0 & 0 \\ 0 & f & 0 \\ 0 & 0 & 1 \end{bmatrix}$$

In Equation (1), above, S is a 3×3 rotation matrix corresponding to a rotation of β (yaw angle) along the optical axis of the camera, and is expressed as:

$$S = \begin{bmatrix} \cos\beta & -\sin\beta & 0 \\ \sin\beta & \cos\beta & 0 \\ 0 & 0 & 1 \end{bmatrix}$$

In Equation (1) R is a 3×3 rotation matrix corresponding to a rotation of (90°+φ) (where φ is the tilt angle) along the X axis, and is expressed as follows:

$$R = \begin{bmatrix} 1 & 0 & 0 \\ 0 & -\sin\phi & -\cos\phi \\ 0 & \cos\phi & -\sin\phi \end{bmatrix}$$

In Equation (1), above, [I|−T] is the expanded matrix of the identity matrix right attached with the transition vector [0,0,−h]$^t$, i.e.:

$$[I|-T] = \begin{bmatrix} 1 & 0 & 0 & 0 \\ 0 & 1 & 0 & 0 \\ 0 & 1 & -h \end{bmatrix}$$

where the origin of the world coordinate system is assumed right below the camera and the camera has an elevation of h above the plane where the world point (X,Y,Z) is located. Thus, the perspective-projection matrix can be derived as:

$$C = \begin{bmatrix} c_{11} & c_{12} & c_{13} & c_{14} \\ c_{21} & c_{22} & c_{23} & c_{24} \\ c_{31} & c_{32} & c_{33} & c_{34} \end{bmatrix}$$

where:
$C_{11}$=f cos β
$C_{12}$=f sin β sin φ
$C_{13}$=f sin β cos φ
$C_{14}$=−hf sin β cos φ
$C_{21}$=f sin β
$C_{22}$=−f cos β sin φ
$C_{23}$=−f cos β cos φ
$C_{24}$=hf cos β cos φ
$C_{31}$=0
$C_{32}$=cos φ
$C_{33}$=−sin φ
$C_{34}$=h sin φ

Given a projection matrix C, the 2D image plane coordinates of a world point at (X,Y,Z) can be computed according to:

$$u = \frac{c_{11}X + c_{12}Y + c_{13}Z + c_{14}}{c_{31}X + c_{32}Y + c_{33}Z + c_{34}}$$

$$v = \frac{c_{21}X + c_{22}Y + c_{23}Z + c_{24}}{c_{31}X + c_{32}Y + c_{33}Z + c_{34}}$$

However, because of the ill-posed inverse problem, it is generally not possible to recover world coordinates from known image points. However, for most surveillance applications, objects of interest are located on a floor or plane, such as an open parking lot, a traffic road, a building floor. With this constraint that objects are positioned on a plane, it is feasible to compute world coordinates from observed image points. With known Z value for the plane of interest, the other two world coordinates X, Y can be calculated by solving for the linear equation system:

$$\begin{bmatrix} a_{11} & a_{12} \\ a_{21} & a_{22} \end{bmatrix} \begin{bmatrix} X \\ Y \end{bmatrix} = \begin{bmatrix} b_1 \\ b_2 \end{bmatrix} \quad (2)$$

where
$a_{11}$=$c_{11}$−u$c_{31}$=f cos β
$a_{12}$=$c_{12}$−u$c_{32}$=f sin β cos φ−u cos φ
$a_{21}$=$c_{21}$−v$c_{31}$=f sin β
$a_{22}$=$c_{22}$−v$c_{32}$=−f cos β sin φ−v cos φ
$b_1$=u$c_{34}$−$c_{14}$+(u$c_{33}$−$c_{13}$)Z=uh sin φ+hf sin β cos φ−(u sin φ+f sin β cos φ)Z
$b_2$=v$c_{34}$−$c_{24}$+(v$c_{33}$−$c_{23}$)Z=vh sin φ−hf cos β sin φ−(v sin φ−f cos β cos φ)Z Thus, to transform world coordinates to 2D image plane coordinates and to determine physical properties of objects (e.g., objects' moving speeds, objects' sizes, objects' spatial positions, etc.) in the scene captured by the camera, the camera's focal length f, tilt angle φ, yaw angle β, and height h of the camera above a plane of the scene need to be determined. To determine these camera parameters at least four constraints are required in order to construct at least four independent equations to solve for the parameters. In the context of video surveillance where objects of interest stay or move on a plane, features of the objects in the scene (which, as noted, may be identified with the aid of a user, or automatically) correspond to geometric information that may be used to define constraints that can be used to solve for the camera's parameters. The constraints that may be defined from identified objects' features include: 1) known distances of lines that are on the plane, 2) known distances of lines that are perpendicular to the plane, and 3) line pairs on the plane with known angles for each pair and/or known distances between those pairs of lines. More particularly, the constrains can be defined by identifying features in the scene, and assigning to those features known pre-determined dimensions that those features are assumed to have. For example, a distance of a line on a plane that is identified as a car length is assumed to have a pre-determined known value of, for example, 5 meters. By assigning such known values to geometric features in the scene that are captured by the camera, constraints are defined that are then used to compute the camera's parameters. In some embodiments, the assumed pre-determined values may be based on the context of the scene captured. For example, if it is determined or known that the scene captured is that of a parking lot, it can be assumed that persons appearing the scene are adults with an average height of, for example, 1750 mm, and that cars are sedans with an average length of 5000 mm. Different scene contexts may thus require different assumptions about physical attributes (e.g., dimensions) of the objects appearing in the scenes.

Constraints that may be defined to enable computing the camera's parameters include:

1. A distance d between point ($X_1$,$Y_1$) to pint ($X_2$,$Y_2$) on the plane:

$$f_1(X_1,Y_1,X_2,Y_2)=(X_1(0)-X_2(0))^2+(Y_1(0)-Y_2(0))^2-d^2=0 \quad (3)$$

2. A vertical line of height Z connecting point ($X_1$,$Y_1$) on the plane and ($X_2$,$Y_2$) that is Z above the plane:

$$f_2(X_1,Y_1,X_2,Y_2)=(X_1(0)-X_2(Z))^2+(Y_1(0)-Y_2(Z))^2=0 \quad (4)$$

3. Two lines, $L_1$ connecting ($X_1$,$Y_1$) and ($X_2$,$Y_2$), $L_2$ connecting ($X_3$,$Y_3$) and ($X_4$,$Y_4$) with an angle θ from $L_1$ to $L_2$:
if θ=90°:

$$f_3(X_1,Y_1,X_2,Y_2,X_3,Y_3,X_4,Y_4)=(Y_2-Y_1)\times(Y_4-Y_3)+(X_2-X_1)\times(X_4-X_3)=0 \quad (5)$$

otherwise:

$$f_3(X_1,Y_1,X_2,Y_2,X_3,Y_3,X_4,Y_4)=(Y_4-Y_3)\times(X_2-X_1)-(Y_2-Y_1)\times(X_4-X_3)-\tan θ\times(X_2-X_1)\times(X_4-X_3)-\tan θ\times(Y_2-Y_1)\times(Y_4-Y_3)=0 \quad (6)$$

Equation (3) represents a constraint corresponding to situation in which lines on a plane have been identified, with respect to which an assumption can be made that such identified lines are associated with a known pre-determined value. For example, a line such as the line 442 in FIG. 4, determined to be a line representing the length of a car, is associated with a pre-determined value d (e.g., d=5000 mm or some other appropriate value) corresponding an average length of a car. Thus, when such line features that are associated with assumed lengths are identified, Equation (3) represents a constraint that the distance between the points in the 3D coordinates system defining the end points of the line have to equal the associated pre-determined distance.

Similarly, Equation (4) represents a constraint corresponding to situation in which vertical lines have been identified, with respect to which an assumption can be made that such identified vertical lines are associated with a known pre-determined value. For example, a line such as the line 432 in FIG. 4, determined to be a line representing the height of a person, is associated with a pre-determined value Z (e.g., Z=1750 mm or some other appropriate value) corresponding an average height of an adult person.

Equations (5) and (6) represent constraints corresponding to situations involving multiple lines that may, or may not, intersect each other. For example, a situation in which θ=0 corresponds to an identified feature of parallel lines with a known distance between them. Such parallel lines may be identified, for example, in an image of a parking lot in which parallel lines defining parking spots are present. Because distance between lines defining a parking spot have a known pre-determined value (or can be assumed to have a known pre-determined value), a constraint can be formulated based on the identification of lines as parallel lines of a parking spot, and based on the assumed known distance between those lines.

Thus, by identifying features in the captured frames that are associated with pre-determined values, corresponding constraints are defined/formulated. When a sufficient number of such constraints have been defined (e.g., to determine 4 unknown camera parameters in η={f,φ,β,h}, at least 4 constraints need to be formulated), various procedures may be used to determine the unknown camera parameters. For example, in some embodiments, the determination of camera parameters can be formulated as an optimization problem performed to minimize the average error:

$$\eta = \arg\min_{\eta}(err(\eta)) \quad (7)$$

with, $$err(\eta) = \frac{\lambda_1}{n1}\sum_{i=1}^{n1}|f_{1i}| + \frac{\lambda_2}{n2}\sum_{i=1}^{n2}|f_{2i}| + \frac{\lambda_3}{n3}\sum_{i=1}^{n3}|f_{3i}| \quad (8)$$

where $f_{ki}$ denotes the $i^{th}$ constraint function of the various constraints types defined in Equations (3)-(6). For example, constraint type 1 may correspond to a distance d between two point on the plane, constraint type 2 may correspond to a vertical line of height Z connecting point $(X_1,Y_1)$ on the plane and a point $(X_2,Y_2)$ that is Z above the plane, and constrain type 3 may correspond to two lines, $L_1$ connecting $(X_1,Y_1)$ and $(X_2,Y_2)$, and $L_2$ connecting $(X_3,Y_3)$ and $(X_4,Y_4)$ with an angle θ from $L_1$ to $L_2$, etc. There may be additional constraint types other than those defined in relation to Equations (3)-(6)). $\lambda_k$ is a weighting factor for type k constraint, which may be adapted to be representative of confidence about the robustness and accuracy for the related constraint type. In some embodiments, all λ's may be set to one (1) to let all the constraint types play substantially the same role (i.e., have the same weight) in camera calibration.

With a set of defined constraints, the calibration process proceeds as follows. Given an instance of calibration parameter η, for each constraint (which may be represented as image plane coordinates of line(s) of specific constraint type), the corresponding world points are computed using Equation (2) which is further utilized to compute the appropriate constraint functions (e.g., one of Equations (3) through (6)). As a result, an average error err(η) is obtained, with different values of η providing different error values. The η providing the minimum err(η) may be taken, in some embodiments, as the calibration results for the camera. This optimization problem can be solved using nonlinear optimization procedures. In some embodiments, in order to derive proper meaningful results, additional regularizations may be adopted, depending on what constraint types are used for the calibration process.

Feature Identification

As noted, features in the captured frame of a scene are identified manually and/or automatically, e.g., to enable formulation of constraints from which parameters of the capturing camera(s) can be determined. To identify features manually, a graphic user interface may be used that is configured to enable a user to specify constraint data by manipulating video clips or a real-time video stream. For example, FIG. 4 depicts a frame of a 2D image plane obtained by the camera. Using a user-interface, a user can freezes video stream (to thus obtain a captured frame like the frame of FIG. 4), identify features by, for example, drawing constraint lines over the a person or a car of common sizes (e.g., draw the vertical line 432, or the line 442), indicate constraint type for the identify features (e.g., indicate that line 432 is a type 2 constraint, and that line 442 is a type 1 constraint), input the physical parameters such as on-plane lines' lengths, vertical line's height (perpendicular to the plane), angles between on-plane lines, etc. In the Example of FIG. 4, a user may mark the point immediately underneath the feet of the person 430 with a circle 434, and mark the point immediately above the person's head with an "x." The user can then draw a line between these two marked points, or, in some embodiments, the user interface may automatically cause a line to be drawn between these two points. As further shown in FIG. 4, in some embodiments, the line 442, corresponding to the length of the car 440, may be generated by the user marking an "x" directly below the car's nearest point and farthest point on the driver side of the car (i.e., the car's left side). Here too, the user may also be able to draw, using the user interface, a line passing between the two marked points, or the user interface may automatically cause a line to be generated between the two points marked by the user.

Constraint data can also be obtained automatically to thus achieve camera auto-calibration requiring little or no human intervention. The basic idea is to perform automatic object classification, and to make reasonable assumptions about classified objects, e.g., the average height of individual person, the average length of sedan cars, etc., which can serve as approximation for corresponding classified objects.

Figure 5:
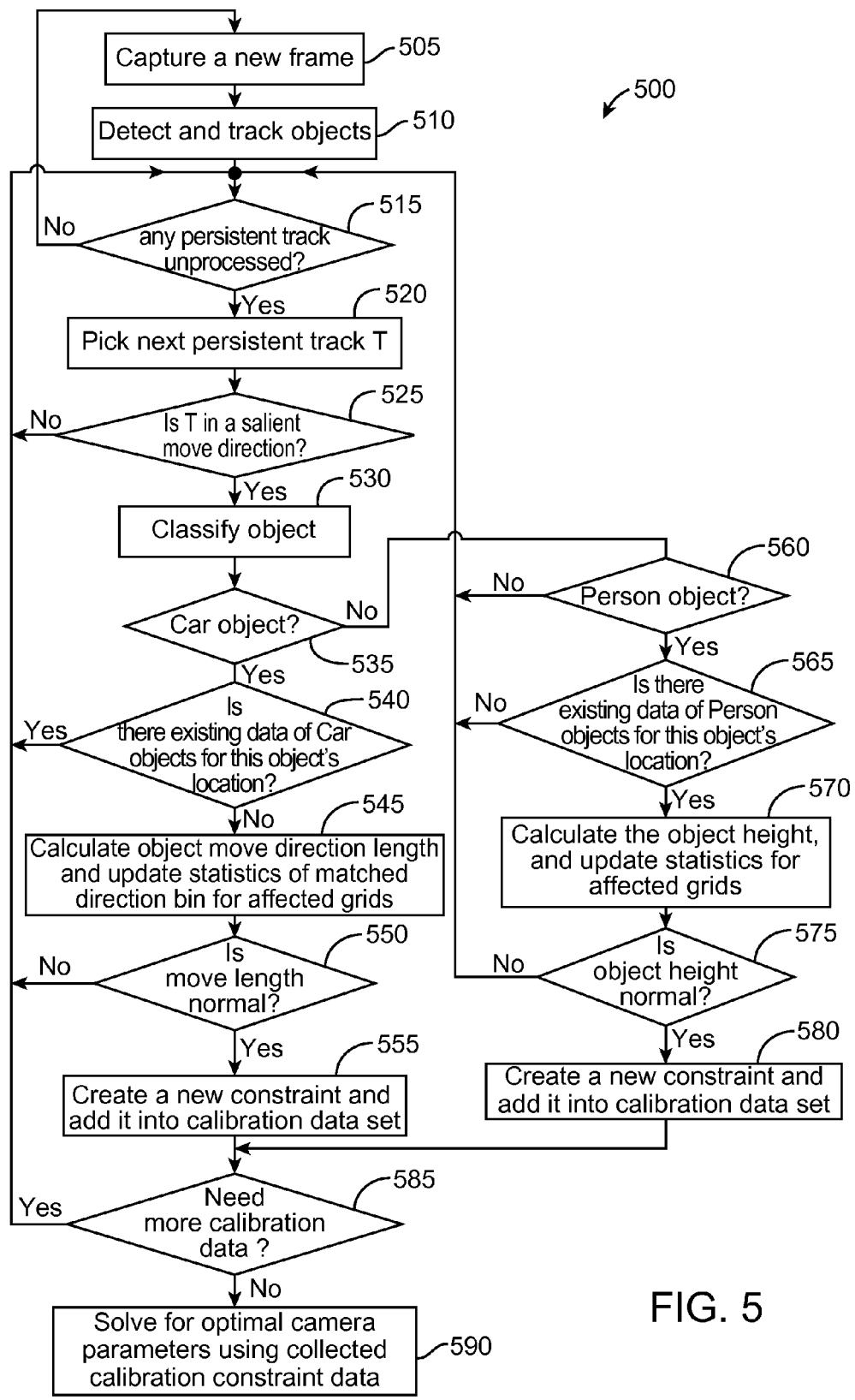
FIG. 5 is a flow diagram of an example procedure to automatically detect objects, classify them, and identify/extract features from the classified objects.

FIG. 5 is a flow diagram of an example procedure 500 to automatically detect objects, classify them, and identify/extract features from the classified objects that can be used for camera calibrations. As shown, the procedure includes capturing 505 a frame using a camera such as the camera 310 depicted in FIG. 3, which may be similar to any of the cameras described in relation to FIGS. 1A and 1B. As noted, in some embodiments, the camera 310 may capture and process frames, and/or the camera may transmit at least some of the captured frames to a remote computing system, such as the host system 160 of FIG. 1A, which may perform some of the frame processing (e.g., to track and classify objects, identify features and calibrate the camera).

As further shown in FIG. 5, objects in the scene are detected and tracked 510 using the captured frame(s). Object detection may be performed, in some implementations, based on motion blob extraction, and object tracking may be performed based on blob matching over successive image frames. Motion blob extraction can be achieved by any background subtraction methods, such as running average, Gaussian mixture model, non-parameter statistical model. For example, in some embodiments, an input pixel may be classified as a foreground pixel or background pixel depending on the difference between its pixel value (e.g., intensity or color) and the background model at its location, and neighboring foreground pixels may be grouped together through a labeling process to form motion blobs (objects). Objects are further tracked over successive frames by applying object tracking techniques such as Kalman filtering, particle filtering, or mean-shift tracking, to the object's features (e.g., size, height, move speed and direction, shape, etc.) Various other techniques for object detection and tracking may also be used. Examples of other object detection and tracking procedures are provided, for example, in patent application Ser. No. 13/302,984, entitled "Geographic Map Based Control," the content of which is hereby incorporated by reference in its entirety.

In some implementations, a trajectory history can be maintained for each of the objects that are extracted and tracked from successive frames of video content. The trajectory history represents the path that the object has taken over time. The trajectory history of each of the object extracted from the video content can be examined to determine whether the object has a persistent track (i.e., a track that is deemed to correspond to a moving object). In some implementation, the persistence of a track can be determined based on the size of the corresponding object from frame to frame. For example, the size of the object is determined to be persistent if its size is within a small distance to the average of object size, while the average is computed over the object's latest history of a number of frames (e.g., at least 5 frames). If it determined that an object changed its size dramatically compared to its current average, then the object's track is determined not to be persistent, and thus the object being tracked will be excluded as a viable candidate for further object motion analysis and processing (e.g., to perform object identification and classification) and may be discarded as being noise. A potential object being tracked may also be determined not to be a real object if the object fails to appear in a minimum number of sequential frames. For example, some video cameras capture video content at a rate of thirty frames per second, and if a potential object does not appear in a minimum number of the captured video frames, the potential is discarded as noise.

Thus, the procedure 500 includes determining 515 whether there are any resultant persistent tracks (i.e., resulting from the object detection and tracking operations). If it is determined that there is at least one persistent track, then a persistent track T is picked 520 from the resultant persistent tracks determined through the object detection and tracking operations. On the other hand, if there are no current tracks determined to be persistent tracks (e.g., because not enough frames including potential candidate tracks have been processed, because no viable potential persistent track candidates have been identified yet, etc.), then frames capturing and frame processing (e.g., object detection and tracking operations) are continued. The frame capture and object detection and tracking operations 505 and 510 may continue in parallel to other operations of procedure 500. That is, even when performing additional processing with respect to identified persistent tracks, the frame capture and object detection and tracking operations 505 and 510 may continue to be performed so as to continue identifying potential moving objects following persistent paths/tracks.

The selected track T, corresponding to motion of a detected object, may, in some implementations, be examined to determine 525 whether the object is in a salient move direction. A salient move is one where the object has moved over a predetermined threshold distance. A salient move direction for an object represents a direction along which the object has moved consistently a significant distance. An object may be represented by either a bounding box or its contour, and the position of the bounding box or the contour can be compared from frame to frame to determine whether the object has undergone a salient move. If a persistent track is determined not to be in a salient move direction, further processing with respect to the current track is suspended, and a determination is made, at 515, whether there other persistent tracks that are to be further analyzed (if there are no further persistent tracks, capturing and object detection and tracking operation, at 505 and 510, continue). In some embodiments, an object corresponding to a track determined not to have a salient move direction may still be tracked in subsequent frames, and its track may later be determined to have a salient move direction.

If the current track T being processed is determined to be a track in a salient move direction, the object corresponding to the track T is classified 530. Object classification may be performed, for example, through clustering of object sizes and aspect ratios to automatically learn/define features of objects (e.g., to define normal person objects, normal car objects, etc.) and group them into respective categories. The aspect ratio of an object is the ratio of the height of the object to the width of the object in the two-dimensional image frame (e.g., such as the 2D image frame shown in FIG. 4). The directional aspect ratio of the object represents the ratio of the object's length in perpendicular direction vs. that in the parallel direction in terms of the salient move direction. The aspect ratio of some objects may change as the object changes directions. For example, the aspect ratio of a vehicle traveling from left to right across a frame may change if the vehicle makes a turn and begins to move either up or down in the frame. Most vehicles are longer than they are wide. Therefore, the aspect ratio of the vehicle will change depending on the direction that the vehicle is traveling. The width of the object representing the vehicle is likely to be greater than the height as the vehicle moves horizontally across the frame and the height of the object representing the vehicle is likely to be greater when the vehicle is moving vertically along the frame. In contrast, the aspect ratio of a person appears to be constant no matter where and no matter which directions the person travels in the scene. Thus, the information of whether the aspect ratio of an object changes as it changes direction can be used to facilitate classifying the object. Furthermore, a vehicle has a constant value of directional aspect ratio no matter where and no matter which direction it moves, while a person changes this value as move direction varies. Thus, this property also helps to classify the object.

Thus, object classification includes determining aspect ratios of an object based, at least in part, on the object's dimensions. Based on the determined aspect ratio and directional aspect ratio, a determination is made 535 of whether the current object is a car object. For example, if the object is determined to have a substantially constant directional aspect ratio as its move direction varies, and/or is determined to have a varying aspect ratio, the object is deemed to be a car object. When an object is classified as a car object, a determination is made 540 whether at the current location of the object (e.g., at the current 2D image plane coordinates) is already associated with existing data. If there is existing data for that location, this may indicate that other car objects were detected before in this location, and it may therefore not be necessary to take into account further car objects as constraints in the same location (although the newly classified car object may still be considered for noise removal). Under those circumstances, when data at the current location of the classified object already exists, further processing for the object is suspended, and the next persistent track (if there is another one) can be processed (as determined at 515).

Figure 6:
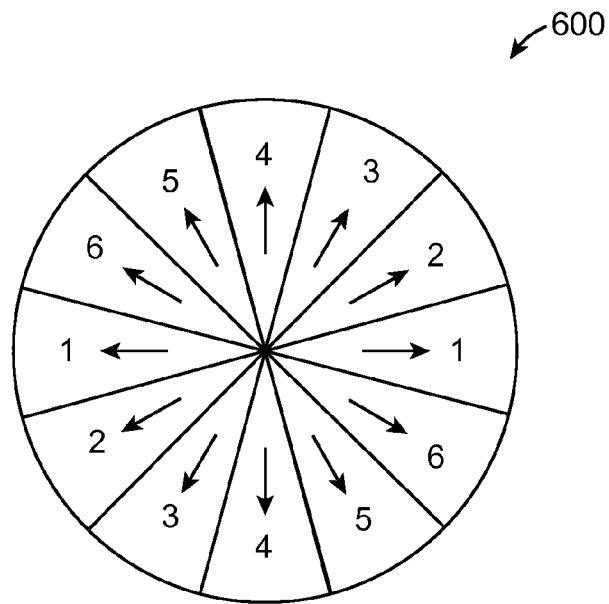
FIG. 6 is a diagram illustrating directional bins.

If it is determined that there is no existing data for the classified car, the car object's move length is computed 545 and the respective cluster's statistics are updated. In some embodiments, several car object clusters may be provided that correspond to directional ranges in which car objects may move. For example, the whole 360 degrees range in the 2D image plane may be divided into directional bins (e.g., 6, 12, 18, etc.), each occupying two opposite degree ranges (e.g., 30° range where six bins are used). FIG. 6 is a diagram illustrating directional bins 600. As shown in FIG. 6, bin 1 indicates the range from −15° to 15° and 165° to −165°, bin 2 for 15° to 45° and −165° to −135° and so on. Associated with each bin are mean, standard deviation, and occurrence counts (e.g., probability) that represent the directional length of Car objects moving in the corresponding direction. In some embodiments, Gaussian mixture modeling may be used.

In some implementations, the clustering process may be based on two types of clustering: grid-level clustering and scene-level clustering. For computational efficiency, a camera's entire field of view may be reduced into an array of grids (grid map) by downscaling either uniformly or according to the camera's perspective information (if available). For example, a scene of 640×480 pixels can be represented using an 80×60 grid map via an 8×8 down-scaling. Each grid in the map corresponds to a local scene area and has Gaussian mixture models associated with that grid. Whenever a persistently tracked object visits a grid area, the Gaussian mixture model associated with that grid can be updated with object size information. Thus, if grid level clustering is used for car objects, the parameters of the appropriate directional bin(s) associated with the current grid are updated.

Having computed the car object's move direction length, a determination is made 550 of whether the computed move direction length is normal. A Car object is considered a normal car when its move direction length is within a certain range of the mean length (as may be indicated by a statistical parameter in the cluster associated with the classified object). Thus, in some embodiments, to determine if a car object's length is normal, dimensions of the car object are compared to statistical measures stored in the cluster associated with the car object.

Figure 7:
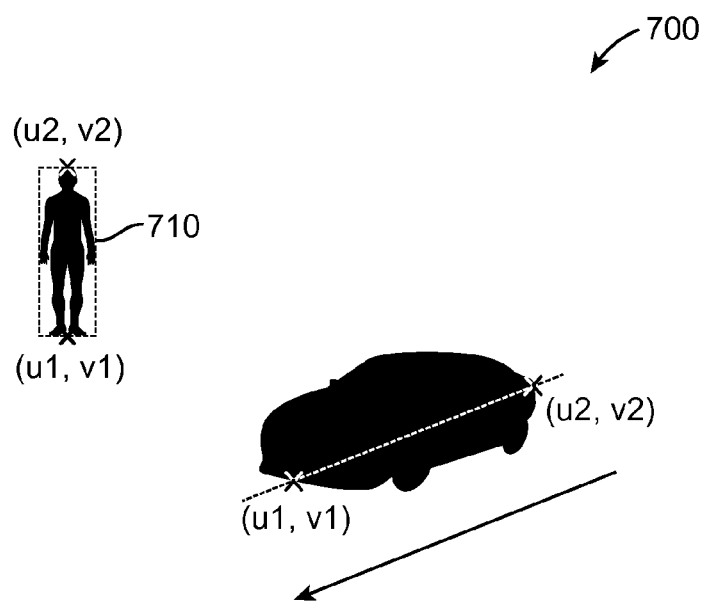
FIG. 7 is a diagram of a 2D image plane.

If the car object is determined not to have a normal length, further processing with respect to the current object is suspended, and the operations of 515 continue (i.e., determine if there are any further persistent tracks). If the car object is determined to have a normal length, a new constraint may be derived for features of the car object that can be used in the calibration process. To derive a constraint, the now classified object has its motion mask segmented from the background image to derive meaningful calibration information from the motion mask. A motion mask is a local image area that a detected object occupies, as identified through large differences of pixel values (or colors) between input pixels and background models used in the area. For example, in FIG. 7, showing a diagram of a 2D image plane 700, the length of the car object projected onto the ground plane can be approximated by the intersecting line segment of its motion mask and the longest parallel line of its salient move direction. If there are multiple parallel intersecting lines have the same maximum length, the line at the lowest location is selected, i.e., the one nearest the ground. Because the length of a car is associated with an assumed pre-determined value (e.g., 5000 mm), when the car object is determined to be a normal car object, a 5-element set is formed, namely, (u1,v1,u2,u2,L), where (u1, v1) and (u2,v2) are the image coordinates of the two end points of the intersecting line that is parallel to the car's salient move direction, and L is the assumed pre-determined length (e.g., 5000 mm) of the Car object in the move direction. This 5-element set can be used to formulate a constraint (e.g., such as the type 1 constraint represented by Equation (3)) that will be used to determine the camera's parameters, and thus calibrate the camera.

In a manner similar to the processing performed on an object classified as a car object, if an object is determined 560 to be a person object, a determination is made 565 whether the current location of the object (e.g., at the current 2D image plane coordinates) is already associated with existing data (if there is existing data for that location, this may indicate that other person objects were detected before in this location, and it may therefore not be necessary to take into account further person objects as constraints in the same location. When data at the current location of the classified object already exists, further processing for the object is suspended, and the next persistent track (if there is another one) can be processed (as determined at 515). Likewise, if the current object is determined (at 560) not to be a person object (e.g., based, at least in part, on previously determined aspect ratios of the object), further processing for the current object is suspended, and the next persistent track (if there is one) is processed.

If it is determined that there is no existing data for the classified car, the person object's height is computed 570 and the respective cluster's statistics are updated. For example, object height statistics for mean, standard deviation, and occurrence, which serve as a reference for normal Person object detection, are updated. As noted, in some embodiments, grid level clustering may be used, in which case there may be several person object clusters corresponding to various grids. Accordingly, the cluster statistics for the affected grid are updated under these circumstances.

Having computed the person object's height (in terms of the 2D coordinates of the image plane), a determination is made 575 of whether computed height length is normal. A person object is considered to have a normal height when its vertical length is within a small distance from the mean of the vertical length relative to the standard deviation for the location where the object is detected. For example, an object may be considered as a normal person if his or her height (2D image height) is within the range of 0.2 times the standard deviation away from the mean height value at this location. Thus, in some embodiments, to determine if an object's height is normal, dimensions of the person object are compared to statistical measures stored in the cluster associated with the person object.

If the person object is determined not to have a normal height, further processing with respect to the current object is suspended, and the operations of 515 continue (i.e., to determine if there are any further persistent tracks). If the person object is determined to have a normal height, a new constraint may be derived for features of the object to be included in the calibration procedure. As noted, to derive a constraint, the now classified object has its motion mask segmented from the background image to derive meaningful calibration information from the motion mask. As shown in FIG. 7, for a Person object, its image coordinates of feet and head points can be obtained as the centers of the bottom and top of, for example, its bounding box 710.

Because the height of a person is associated with an assumed pre-determined value (e.g., 1750 mm), when the person object determined to be a normal (e.g., object's height is close to the mean height maintained in the Person cluster in terms of corresponding standard deviation) a 5-element set is formed, namely, (u1,v1,u2,u2,H), where (u1,v1) indicates feet image coordinates, (u2,v2) head top image coordinates, and H is the assumed pre-determined vertical physical height (e.g., 1750 mm) of the person. This 5-element set can be used to formulate a constraint (e.g., such as the type 2 constraint represented by Equation (4)).

Once a sufficient number of constraints has been obtained, as determined at 585, the camera parameters can be determined in the manner described in relation to operations 230 of FIG. 2 and Equations (1)-(8). In some embodiments, determining four (4) constraints may be sufficient to determine the camera's parameters, and thus to calibrate the camera.

In some implementations, based on the collected constraint data, a further process may be carried out to remove noisy constraints (outliers) using RANSAC (RANdom SAmple Consensus) procedure for robust calibration performance. For example, a preset number of iterations can be executed, and within each iteration a subset (at least four data sets) of the collected constrain data are randomly selected and applied to estimate the parameters of the camera. The camera parameters resulting from a particular iteration are obtained, and these parameters are further evaluated for each of the constraint data sets that were not selected in the current iteration to check whether the resultant parameters of the current iteration fit (e.g., are consistent) with the other not-selected constraint data. If a constraint data set fits well the obtained parameters, that constraint data set is considered as an inlier set (otherwise, the set is considered as an outlier set). Finally, the parameters of camera that produce the maximum number of inliers, which are estimated by taking into account all the inliers through optimization, are selected as the final calibration results.

Procedure 500 described herein is but one example of procedures to implement object identification, object classification, and feature determination to enable defining constraints that can be used to calibrate the camera. Other procedures for object identification, object classification, and feature determination can be used instead of or in addition to the procedure 500. As noted, object detection and tracking procedures such as those described in patent application Ser. No. 12/982,601, entitled "Searching Recorded Video," and in patent application Ser. No. 13/302,984, entitled "Geographic Map Based Control."

Implementations for Processor-Based Computing Systems

Figure 8:
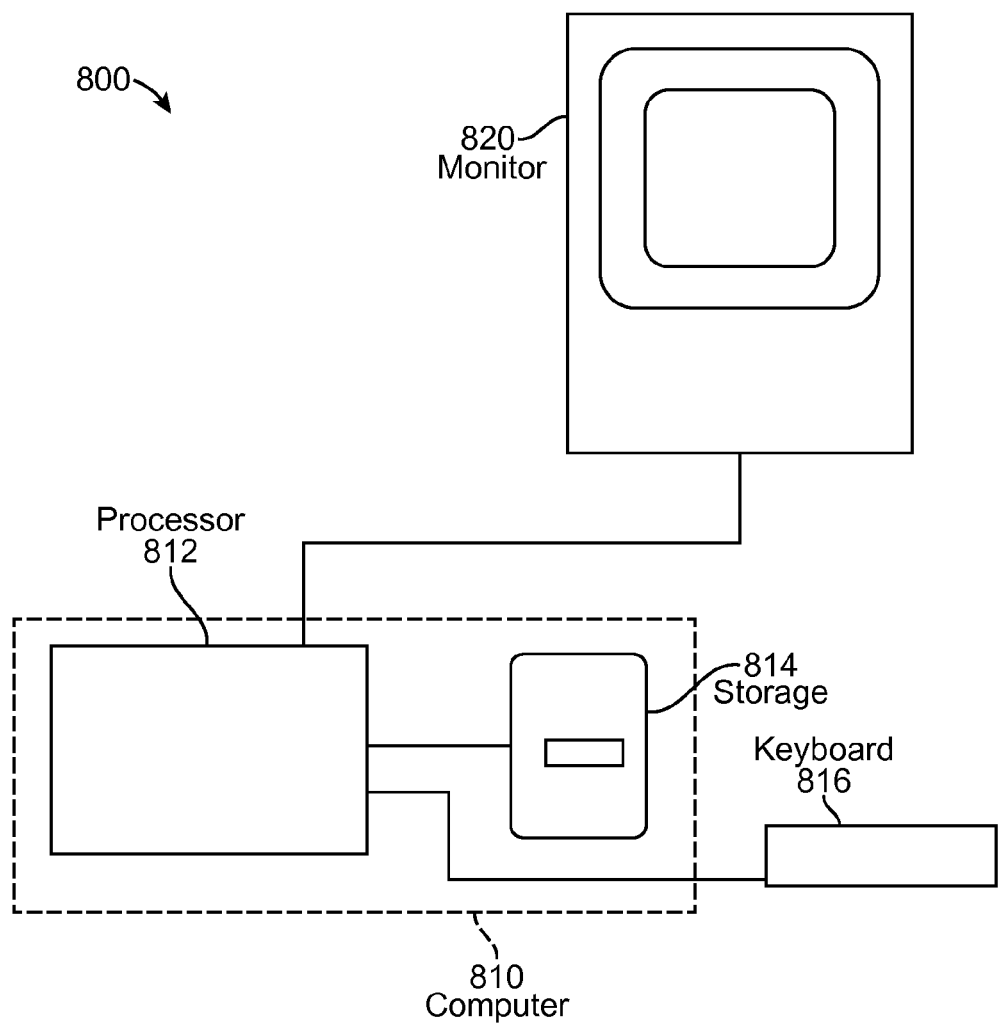
FIG. 8 is a schematic diagram of a generic computing system.

Performing the video/image processing operations described herein, including the operations to detect and track objects, classify objects, identify features of the object (e.g., features that are associate with pre-determined values), and calibrate a camera using the identified features and their associated pre-determined values, may be facilitated by a processor-based computing system (or some portion thereof). Also, any one of the processor-based devices described herein, including, for example, the host computer system 160 and/or any of its modules/units, any of the processors of any of the cameras of the network 100, etc., may be implemented using a processor-based computing system such as the one described herein in relation to FIG. 8. Thus, with reference to FIG. 8, a schematic diagram of a generic computing system 800 is shown. The computing system 800 includes a processor-based device 810 such as a personal computer, a specialized computing device, and so forth, that typically includes a central processor unit 812. In addition to the CPU 812, the system includes main memory, cache memory and bus interface circuits (not shown). The processor-based device 810 may include a mass storage element 814, such as a hard drive or flash drive associated with the computer system. The computing system 800 may further include a keyboard, or keypad, or some other user input interface 816, and a monitor 820, e.g., a CRT (cathode ray tube) or LCD (liquid crystal display) monitor, that may be placed where a user can access them (e.g., the monitor of the host computer system 160 of FIG. 1A).

The processor-based device 810 is configured to facilitate, for example, the implementation of operations to detect and track moving objects, classify object, identify features, use the identified features in camera calibration, etc. The storage device 814 may thus include a computer program product that when executed on the processor-based device 810 causes the processor-based device to perform operations to facilitate the implementation of the above-described procedures. The processor-based device may further include peripheral devices to enable input/output functionality. Such peripheral devices may include, for example, a CD-ROM drive and/or flash drive (e.g., a removable flash drive), or a network connection (e.g., implemented using a USB port and/or a wireless transceiver), for downloading related content to the connected system. Such peripheral devices may also be used for downloading software containing computer instructions to enable general operation of the respective system/device. Alternatively and/or additionally, in some embodiments, special purpose logic circuitry, e.g., an FPGA (field programmable gate array), an ASIC (application-specific integrated circuit), a DSP processor, etc., may be used in the implementation of the system 800. Other modules that may be included with the processor-based device 810 are speakers, a sound card, a pointing device, e.g., a mouse or a trackball, by which the user can provide input to the computing system 800. The processor-based device 810 may include an operating system, e.g., Windows XP® Microsoft Corporation operating system. Alternatively, other operating systems could be used.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method to calibrate a camera, the method comprising:
    capturing by the camera a frame of a scene;
    performing, by a programmable processor, object classification for multiple objects of multiple object types appearing in the captured frame to determine a respective object type for each of the multiple objects;
    determining, by the programmable processor, the respective object type for the each of the multiple objects based on geometrical information, including line orientation information;

identifying, by the programmable processor, salient line features, including at least one of: one or more line pairs that are parallel or at an angle to each other, one or more lines that are on a plane, and one or more lines that are perpendicular to the plane, for the multiple objects of the multiple object types appearing in the captured frame;

assigning, by the programmable processor, each of the identified salient line features a respective pre-determined value representative of an average physical dimension based on the respectively determined object type for the each of the multiple objects appearing in the captured frame;

deriving, by the programmable processor, multiple constraint terms based on the identified salient line features for the multiple objects of the multiple object types appearing in the captured frame and the pre-determined values assigned to the identified salient line features; and determining, by the programmable processor, parameters of the camera that minimize an error function computed using the multiple constraint terms derived based on the identified salient line features for the multiple objects of the multiple object types appearing in the captured frame.

2. The method of claim 1, wherein identifying the salient line features appearing in the captured frame comprises:
automatically detecting at least one object appearing in one or more frames;
automatically classifying the detected at least one object appearing in the one or more frames; and
automatically identifying features of the classified at least one object, the automatically identified features assigned pre-determined average values representative of physical dimensions for the at least one classified object.

3. The method of claim 2, wherein automatically classifying the detected at least one object comprises:
determining aspect ratios based on dimensions of the at least one detected object;
determining a corresponding object type for the at least one object based on the determined aspect ratios; and
comparing the dimensions of the at least one object to statistical measures stored in a cluster corresponding to the determined object type.

4. The method of claim 3, wherein comparing the dimensions of the at least one object comprises:
updating, based on the dimensions of the at least one object, local models of object size for locations visited by persistently tracked objects; and
updating global clusters by associating local models with the global clusters, the local models having an object size matching that associated with the global cluster.

5. The method of claim 2, wherein the classified at least one object includes one or more of:
a person associated with a pre-determined average height, and a car associated with a pre-determined average length.

6. The method of claim 1, wherein determining the parameters of the camera comprises:
determining one or more of: a focal length f of the camera, a tilt angle $\phi$ of the camera, a yaw angle $\beta$ of the camera, and a height h of the camera above a plane of the scene corresponding to the captured frame.

7. The method of claim 1, further comprising:
removing noisy constraints (outliers) using RANSAC (RANdom SAmple Consensus) procedure.

8. The method of claim 1, wherein the identified salient line features comprise one or more of: distance between two points in the captured frame of the scene, a vertical line extending from a plane of the captured frame, and two lines extending between two pairs of points in the captured frame with one of the two lines being at an angle relative to the other of the two lines.

9. The method of claim 8, wherein the distance between the two points in the captured frame comprises length of a car in the captured frame of the scene, the car associated with an approximate pre-determined length.

10. The method of claim 8, wherein the vertical line extending from the plane of the scene comprises height of a person in the scene, the person associated with an approximate pre-determined height.

11. The method of claim 1, further comprising:
determining attributes of objects located in the scene based on camera coordinates of images of the objects appearing in one or more captured frames, and based on the determined parameters of the camera.

12. The method of claim 11, wherein the determined attributes of the objects comprise one or more of: spatial position in the scene of at least one of the objects, and length of the at least one of the objects in a particular direction.

13. A system comprising: at least one camera to capture frame data; and one or more processors configured to perform operations to calibrate the at least one camera, the operations comprising:
capturing by the at least one camera a frame of a scene;
performing object classification for multiple objects of multiple object types appearing in
the captured frame to determine a respective object type for each of the multiple objects;
determining the respective object type for the each of the multiple objects based on geometrical information, including line orientation information;
identifying salient line features, including at least one of: one or more line pairs that are parallel or at an angle to each other, one or more lines that are on a plane, and one or more lines that are perpendicular to the plane, for the multiple objects of the multiple object types appearing in the captured frame;
assigning each of the identified salient line features a respective pre-determined value representative of an average physical dimension based on the respectively determined object type for the each of the multiple objects appearing in the captured frame;
deriving multiple constraint terms based on the identified salient line features for the multiple objects of the multiple object types appearing in the captured frame and the pre-determined values assigned to the identified salient line features; and
determining parameters of the camera that minimize an error function computed using the multiple constraint terms derived based on the identified salient line features for the multiple objects of the multiple object types appearing in the captured frame.

14. The system of claim 13, wherein the one or more processor configured to perform the operations of identifying the salient line features appearing in the captured frame are configured to perform operations comprising:
automatically detecting at least one object appearing in one or more frames;
automatically classifying the detected at least one object appearing in the one or more frames; and
automatically identifying features of the classified at least one object, the automatically identified features assigned pre-determined average values representative of physical dimensions for the at least one classified object.

15. The system of claim 14, wherein the one or more processors configured to perform the operations of automatically classifying the detected at least one object are configured to perform operations comprising:
    determining aspect ratios based on dimensions of the at least one detected object;
    determining a corresponding object type for the at least one object based on the determined aspect ratios; and
    comparing the dimensions of the at least one object to statistical measures stored in a cluster corresponding to the determined object type.

16. The system of claim 14, wherein the classified at least one object includes one or more of: a person associated with a pre-determined average height, and a car associated with a pre-determined average length.

17. The system of claim 13, wherein the one or more processors configured to perform the operations of determining the parameters of the camera are configured to perform operations comprising:
    determining one or more of: a focal length f of the camera, a tilt angle $\phi$ of the camera, a yaw angle $\beta$ of the camera, and a height h of the camera above a plane of the scene corresponding to the captured frame.

18. A non-transitory computer readable media programmed with a set of computer instructions executable on a processor that, when executed, cause operations comprising:
    capturing by a camera a frame of a scene;
    performing object classification for multiple objects of multiple object types appearing in the captured frame to determine a respective object type for each of the multiple objects;
    determining the respective object type for the each of the multiple objects based on geometrical information, including line orientation information;
    identifying salient line features, including at least one of: one or more line pairs that are parallel or at an angle to each other, one or more lines that are on a plane, and one or more lines that are perpendicular to the plane, for the multiple objects of the multiple object types appearing in the captured frame;
    assigning each of the identified salient line features a respective pre-determined value representative of an average physical dimension based on the respectively determined object type for the each of the multiple objects appearing in the captured frame;
    deriving multiple constraint terms based on the identified salient line features for the multiple objects of the multiple object types appearing in the captured frame and the pre-determined values assigned to the identified salient line features; and
    determining parameters of the camera that minimize an error function computed using the multiple constraint terms derived based on the identified salient line features for the multiple objects of the multiple object types appearing in the captured frame.

19. The computer readable media of claim 18, wherein the computer instructions that cause the operations of identifying the salient line features appearing in the captured frame comprise instructions to cause operations comprising:
    automatically detecting at least one object appearing in one or more frames;
    automatically classifying the detected at least one object appearing in the one or more frames; and
    automatically identifying features of the classified at least one object, the automatically identified features assigned pre-determined average values representative of physical dimensions for the at least one classified object.

20. The computer readable media of claim 18, wherein the computer instructions that cause the operations of determining the parameters of the camera comprise instructions that cause operations comprising:
    determining one or more of: a focal length f of the camera, a tilt angle $\phi$ of the camera, a yaw angle $\beta$ of the camera, and a height h of the camera above a plane of the scene corresponding to the captured frame.

21. The method of claim 1, further comprising:
    determining context associated with the captured frame;
    selecting, based on the determined context, the respective pre-determined value, for the each of the identified salient line features, representative of the average physical dimension for the object type respectively determined for the each of the multiple objects appearing in the captured frame; and
    assigning to the each of the identified salient line features the respective pre-determined value representative of the average physical dimension for the object type respectively determined for the each of the multiple objects of the multiple object types appearing in the captured frame.

* * * * *